March 11, 1969  A. D. MICHAEL ET AL  3,432,293
BEARING MATERIALS AND METHOD OF MAKING SAME
Filed Jan. 6, 1966
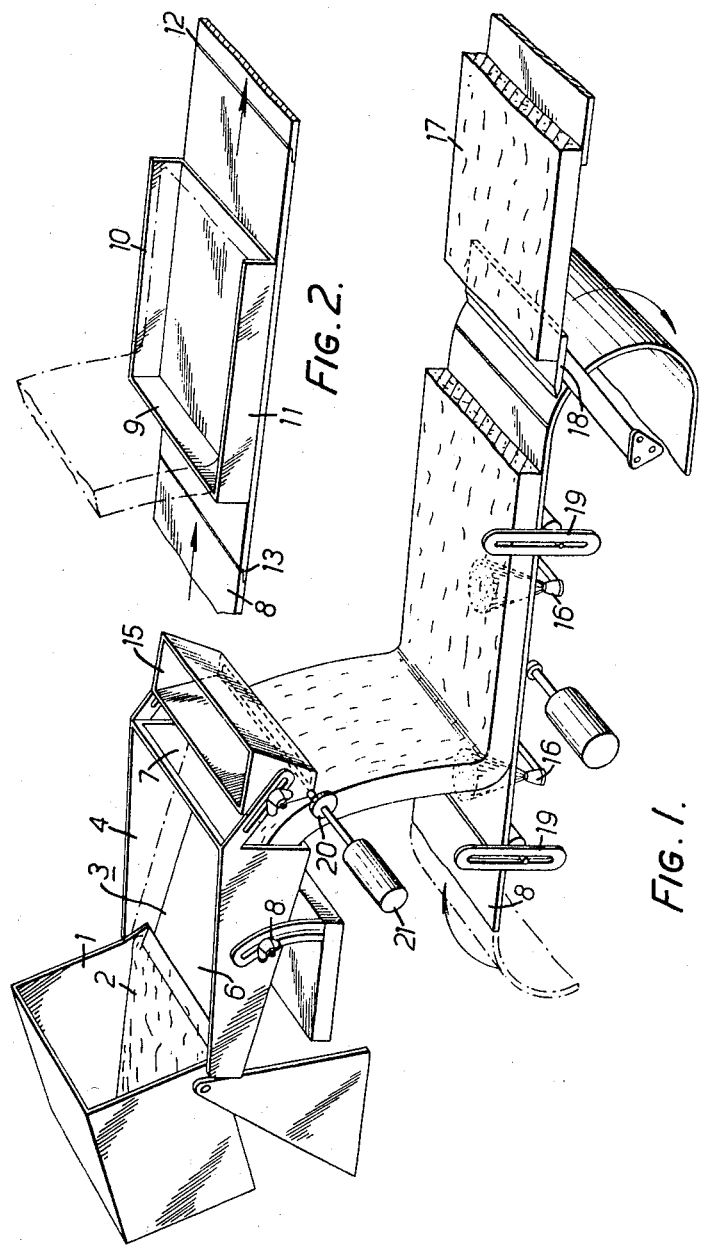
INVENTORS
GEORGE C. PRATT
ANTHONY D. MICHAEL
BY
Pierce, Scheffler & Parker
ATTORNEYS

United States Patent Office 3,432,293
Patented Mar. 11, 1969

3,432,293
BEARING MATERIALS AND METHOD OF MAKING SAME
Anthony D. Michael, London, and George C. Pratt, Chorleywood, England, assignors to The Glacier Metal Company Limited, Middlesex, England, a company of Great Britain
Filed Jan. 6, 1966, Ser. No. 519,096
U.S. Cl. 75—138                                    11 Claims
Int. Cl. C22c 1/02, 21/00

ABSTRACT OF THE DISCLOSURE

The invention is a method of casting a bearing lining of an alloy by injecting that component of the alloy having the higher specific gravity into a free falling stream of the other alloy component, and collecting and solidifying the stream of combined metals on a moving belt or backing for the bearing lining.

---

This invention relates to a method of making bearings and bearing material incorporating metals of different specific gravities, for example a bearing or bearing material including aluminium or an aluminium based alloy and lead or a lead based alloy.

The term "plain bearing" is to be understood as including any member or assembly having, or designed to have in use, a surface which bears directly or through a liquid or solid lubricant against another surface relatively to which it has sliding movement, irrespective of whether the main or sole purpose is to transmit a load from one to the other of the surfaces having a relative sliding movement or whether the sliding contact is solely or partly for some other purpose such, for example, as to provide a seal or to make electrical contact.

The term "lead" used herein is to be understood as including not only lead in substantially pure state but also lead alloys embodying for example, tin, indium, antimony or other alloying elements giving to the lead corrosion-resisting or other desirable characteristics. The lead may contain up to 20% of its weight of tin or antimony or up to 10% of its weight in indium.

The term "aluminium" used herein is to be understood as including not only substantially pure aluminium but also aluminium with the impurities normally found in commercial aluminium, as well as aluminium alloys containing up to 10% by weight of alloying elements such as copper, nickel, manganese, silicon, magnesium or the like for strengthening purposes.

The term "bearing material" as used herein is to be understood as including the material which is subsequently conventionally bonded as by rolling to a steel or other backing to form bimetallic material.

The casting of bearing material having, for example, a high proportion of lead as well as aluminium gives rise to the problem of segregation. This is due to the difference in the specific gravity of lead and aluminium and it is due to this difference that lead settles out from the lighter aluminium constituent when the aluminium is in a liquid phase.

It° is an object of this invention to obtain bearing material in which the metal of higher specific gravity is dispersed in a regular ordered and controlled fashion in a metal having a relatively lower specific gravity.

According to the present invention, in a method of producing a bearing material having metals of different specific gravities an approximately vertically free falling molten stream of the metal of lower specific gravity has injected into it during its fall the metal or a compound of the metal having a higher specific gravity.

The combined stream may be chilled and solidified while travelling vertically. Alternatively, the combined stream may be turned into a substantially horizontal direction and chilled and solidified while flowing in such a direction. In the vertical stream there are no forces acting on either the lower or higher specific gravity metals tending to segregate them. The higher specific gravity metal may be lead, in a lead compound of the lead halide group (with the exception of lead fluoride) and is preferably in lead chloride. Lead oxide, lead sulphide or the organo-lead compounds would be suitable alternative compounds. Lead powder could be used. In the case of lead compounds (other than lead powder) the compound is reduced in the high temperature molten aluminium stream to form lead but it is not necessary that the lead should melt in the molten aluminium as long as it is reduced.

The lower specific gravity metal may be obtained from a furnace having a controllable pouring rate and which is adjustably tiltable to pour into the upstream end of a channel or launder. The channel may be of divergent form diverging in a direction away from the end at which it receives the molten metal. The channel could be substantially horizontal with respect to the vertical stream but is preferably tilted or inclined so that the molten metal runs towards the downstream end of the channel. The channel preferably terminates at its downstream end in a weir. The height of flow of molten material over the weir and, therefore, the mass flow of the vertically falling stream is preferably controlled by an adjustable baffle. Combined stream is preferably received on a substantially horizontal travelling belt. The travelling belt may be provided with a static transverse backplate to prevent flow of molten material in a direction opposite to the direction of travel of the belt. In addition the belt may have two static side plates to prevent molten material falling off the longitudinal sides of the belt. The side plates and undersurface of the belt and also perhaps the backplate may be heated in order to prolong the time that the combined material is molten or, alternatively, chilled so as to solidify the molten material. Alternatively, the side plates may be heated and then chilled as the belt travels away from the falling molten stream. The choice of these alternatives depends on the parameters of the vertical stream. In addition, or alternatively, the vertical combined stream may be heated or cooled or both. The trevelling belt is preferably divided up into a number of longitudinal sections, each section being articulated with respect to its adjacent sections and each passing closely under the static back and side plates. The belt may be provided with means to lift off a continuous strip of bearing material before the belt returns back to reapproach the vertical falling stream. The continuous strip could be used for the manufacture of bimetallic strip by the conventional process of bonding strips of this material to a steel backing strip. It is this bimetallic strip which is used for manufacturing bearings.

Alternatively, the belt may be uncoiled from a coil of aluminised steel or other backing and after being brushed to provide a good bonding surface is passed under the falling combined stream of molten material. The molten metal adheres to the surface of the aluminised steel strip and is trimmed, rolled to consolidate the bond, annealed and cut whereby this material is suitable for manufacture into bearings. To prevent oxidisation of the molten aluminium stream in either alternative apparatus it may be necessary to enclose the stream or the entire apparatus in an inert or suitable reducing atmosphere.

The combined stream is preferably solidified after the downstream end of the vertical falling stream has been received on the substantially horizontal surface and before segregation of the heavier constituents can occur. The flow parameters such as mass flow, height of the vertical stream etc., will be designed appropriately, and where a compound of the heavier metal is used, they will be designed in dependence on the time taken for the reducing of the compound to the metal in the molten lighter metal.

Accordingly, the invention also includes a cast bearing material having lead (for example up to 20% by weight) equally dispersed without segregation in an aluminium structure made by the method, or using the apparatus, defined above.

The invention will now be described by way of example with reference to the accompanying diagrammatic drawings in which:

FIGURE 1 shows a projected view of apparatus for making a bearing material according to the present invention but with the belt, side and back walls, removed for clarity and the vertical stream shown rather larger than in proportion to the remainder of the apparatus; and FIGURE 2 is a sketch showing an alternative.

A furnace 1 containing molten aluminium 2 is shown tilted so as to pour molten aluminium into a channel shown generally at 3. The channel has diverging side walls 4 and 5 which diverge away from one another in the direction of flow of the metal. The base 6 of the channel is also sloping slightly downwards in the direction of flow. The down stream end of the channel has a baffle plate 7 across the end thereof. This baffle 7 is adjustable in height (although the means for adjustment are not shown) and, therefore, the height of metal flow under the baffle 7 at the end of the channel 3 can be controlled and, therefore, the mass flow of the falling molten stream. The channel 3 is adjustably tiltable as shown at 8 so that the flow over the weir can be controlled by adjusting the tilt of the furnace 1 and by adjusting the downward tilt of the channel 3. The broken line shown round the side walls 4 and 5 of the channel 3 shows the level of molten aluminium. The adjustable baffle plate 7 also serves to prevent oxide on the surface of the molten aluminium in the channel 3 from running into the vertical stream.

In the region of the weir (that is in the region of the commencement of the vertical fall) a hopper 15 drops or injects a lead compound, say lead chloride, over the width of the stream of molten aluminium and the amount of lead compound would be such that, say 20% by weight of the finally cast bearing material would be lead. It may be necessary instead of a hopper to provide means to force the lead compound into the stream, but usually the flow can be achieved by vibrating the hopper by means of an eccentric cam 20 driven by a motor 21.

The molten aluminium reduces the injected lead chloride into lead. Molten aluminium falling over the weir formed by the down stream edge of the channel 7 and molten lead from the hopper 15 fall substantially freely and vertically towards a travelling belt 8. The molten lead and molten aluminium in the combined falling stream cannot segregate while falling vertically to any appreciable extent. It is expected that by the time that the combined fall reaches the belt 8 it will be reduced in temperature and increased in viscosity.

The travelling belt 8 may be divided up into a number of longitudinal sections as more clearly shown in FIGURE 2 and the surface of this belt 8 will be treated with a material suitable to prevent the sticking of the molten metal to the belt. Although the belt is divided or articulated it may be done in such a way that molten metal cannot pass through it. One way of doing this is to have the end of one section as a half lap joint with the adjoining section.

As shown in FIGURE 2 the combined aluminium lead fall descends onto the travelling belt 8 which is provided with a fixed back wall 9 to prevent molten material moving backwardly up the belt opposite to the direction in which the belt is travelling. Moreover, there are two fixed side walls 10 and 11 serving to stop molten material falling off the sides of the belt. The belt is articulated as indicated at 12 and 13. The side walls 10 and 11 are heated so that the molten material may remain molten a little bit longer in order that the lead chloride introduced into the molten stream may have time to be converted into lead. Alternatively, the side walls may require chilling by sprays of water or other suitable means whereby the molten material is solidified before the lead particles have had time to segregate towards the surface of the belt 8. The undersurface of the belt may be chilled by water sprays shown at 16 in FIGURE 1. Solidification of the molten aluminium and the dispersed lead particles occurs before the end of the side walls 10 and 11 is reached. The cast combined bearing material is then moved along with the belt so that a free section of the belt arrives under the molten stream and under the static side walls 10 and 11 and the back wall 9.

The slab 17 of finished bearing metal can be prised off the belt 8 by a knife 18 before that section of the belt 8 returns with the assistance of the articulated joint 13, to the position underneath the molten vertical steam and underneath the side and back walls whereby the process is repeated. Thus the process could be a continuous one possibly within the limitation of the volume of molten aluminium contained in the furnace.

Although not shown in the drawings, this method can be applied as a continuous process of making strip bearing material in which coiled steel is uncoiled and aluminised on one face in any suitable conventional manner, subsequently brushed to clean the aluminium surface, and then passed under a vertical stream of molten aluminium rather as in the way previously described. This composite bearing material on its steel backing could then proceed to be trimmed, rolled to consolidate the bond, annealed and cut. Such a complete bearing material can be used directly for the manufacture of bearings whereas, of course, the method and apparatus described first only produces semi-continuously pieces of suitable bearing material which may need to be roll bonded to steel in the conventional manner to form a bimetal strip before they can be used for the manufacture of bearings.

In an alternative and somewhat simpler form of the apparatus a bottom pouring tundish may produce a suitable stream of molten aluminium without needing the channel 3.

The injection of the lead compound should be carried out over the width of the stream and in the region of the arcuate or curved transition from horizontal flow to vertical flow. It is desirable that this curved region should remain constant during the process if the static injection means is to remain effective. In order to keep the curved region of the molten stream constant the pressure head of the molten aluminium will also have to remain constant. The height of the vertical part of the molten stream should be in the range from about 6″ to about 18″. It may be necessary to decelerate the falling combined stream in relation to the belt before it reaches the horizontal travelling belt. This can be accomplished by increasing the downward tilt of the traveling belt in its direction of travel. Alternatively, the molten stream may run down a plate inclined to the belt at an angle of less than 90°. Again this inclined plate may be heated or chilled. With higher falls of molten aluminium it is possible that without such deceleration there will be turbulence as the molten aluminium/lead stream hits the travelling belt. Although this is catered for to some extent by the downward tilt of the belt and the back and side walls it may be necessary to arrange for the belt to tilt upwards over the region in which it receives molten aluminium/lead thus providing a natural trough in this region when combined with suitable modified back and side walls.

Means for adjusting the angle of tilt of the belt are shown at 19.

What we claim as our invention and desire to secure by Letters Patent is:

1. A method of producing a bearing material in the form of an alloy of first and second metals of different specific gravities in which there is added into and admixed with an approximately vertically free falling molten stream of the first metal, during its fall, a second metal or a compound of the second metal which is the metal having the higher specific gravity, the combined metal free falling stream being collected, chilled and solidified on a moving substantially horizontal surface.

2. A method as claimed in claim 1 in which the second metal is injected into the curved flow of the first metal at the commencement of its fall.

3. A method as claimed in claim 1 in which the horizontal surface is the surface of a continuous belt.

4. A method as claimed in claim 1 in which the moving horizontal surface is that of a continuous metal backing strip onto which the cast bearing material is to be bonded.

5. A method as claimed in claim 1 in which the freely forming stream is cooled before it reaches the end of its vertical flow.

6. A method as claimed in claim 1 in which the first metal comprises aluminium.

7. A method as claimed in claim 5 in which the second metal comprises lead.

8. A method as claimed in claim 6 in which up to 20% by weight of lead is added to the falling stream of aluminium.

9. A method as claimed in claim 6 in which the lead is added in the form of a compound.

10. A bearing material consisting of an alloy of first and second metals of different specific gravities which has been made by adding the metal of the higher specific gravity into and admixing the same with a free falling molten stream of the other metal, during the fall of the latter, and collecting, chilling and solidifying the combined metal stream on a moving horizontal surface, in which alloy the metal of higher specific gravity is dispersed in a regular ordered and uniform fashion in the metal having the relatively lower specific gravity.

11. A bearing material as defined in claim 10, said material being a homogeneous alloy in which the metal having the higher specific gravity is lead and constitutes up to 20% by weight of the combined metals and the other metal is aluminium and constitutes at least 80% by weight of the combined metals.

References Cited

UNITED STATES PATENTS

| 3,295,173 | 1/1967 | Webber et al. | 164—275 |
| 3,295,174 | 1/1967 | Webber et al. | 164—275 |
| 3,347,959 | 10/1967 | Engelke et al. | 164—273 |
| 1,956,467 | 10/1930 | Palm | 164—86 X |
| 1,956,468 | 10/1930 | Palm | 164—86 X |
| 2,015,154 | 9/1935 | Palm | 164—86 X |
| 2,203,679 | 6/1940 | Edwards | 164—86 |
| 2,197,259 | 4/1940 | Nead | 164—57 X |
| 3,141,767 | 7/1964 | Funk | 164—57 |
| 963,973 | 7/1910 | Wright. | |

FOREIGN PATENTS

| 267,067 | 3/1927 | Great Britain. |
| 500,040 | 2/1939 | Great Britain. |
| 901,017 | 7/1962 | Great Britain. |

J. SPENCER OVERHOLSER, *Primary Examiner.*

V. RISING, *Assistant Examiner.*

U.S. Cl. X.R.

29—191.2, 191.6; 164—57, 87, 97, 135